United States Patent
Boppana et al.

(10) Patent No.: US 9,340,658 B2
(45) Date of Patent: May 17, 2016

(54) LOW-VOLATILITY PLASTICIZER BLENDS

(71) Applicant: Eastman Chemical Company, Kingsport, TN (US)

(72) Inventors: Venkata Bharat Ram Boppana, Johnson City, TN (US); Joseph Alexander DeLoach, Jonesborough, TN (US); Christopher Harlan Burk, Gray, TN (US)

(73) Assignee: Eastman Chemical Company, Kingsport, TN (US)

( * ) Notice: Subject to any disclaimer, the term of this patent is extended or adjusted under 35 U.S.C. 154(b) by 54 days.

(21) Appl. No.: 14/340,061

(22) Filed: Jul. 24, 2014

(65) Prior Publication Data

US 2016/0024273 A1    Jan. 28, 2016

(51) Int. Cl.
*C07C 69/00* (2006.01)
*C08K 5/103* (2006.01)
*C08K 5/12* (2006.01)
*C08K 5/101* (2006.01)

(52) U.S. Cl.
CPC ............. *C08K 5/103* (2013.01); *C08K 5/101* (2013.01); *C08K 5/12* (2013.01)

(58) Field of Classification Search
CPC .............................. C07C 69/28; C07C 15/08
USPC ........................................................ 560/129
See application file for complete search history.

(56) References Cited

U.S. PATENT DOCUMENTS

| | | | |
|---|---|---|---|
| 2,139,369 A | 12/1938 | Kyrides | |
| 2,687,430 A | 8/1954 | Snow et al. | |
| 2,789,509 A | 4/1957 | Reynolds et al. | |
| 2,877,190 A | 3/1959 | Canterino | |
| 2,939,886 A | 6/1960 | Pritchard et al. | |
| 3,560,429 A | 2/1971 | Bilow et al. | |
| 3,993,699 A | 11/1976 | Maeda et al. | |
| 4,239,703 A | 12/1980 | Bernhardt et al. | |
| 4,283,565 A | 8/1981 | Bernhardt et al. | |
| 4,301,088 A | 11/1981 | Bernhardt | |
| 6,600,080 B1 | 7/2003 | Nagamura et al. | |
| 6,797,844 B2 | 9/2004 | Nakai | |

FOREIGN PATENT DOCUMENTS

EP    0 225 802 A2    6/1987

OTHER PUBLICATIONS

Bengelsdorf, Irving S.; "Oxidation and Characterization of $a,a'$-Dichloro-$p$-xylene"; Journal of Organic Chemistry, vol. 23; 1958; pp. 242-244.

*Primary Examiner* — Wenwen Cai
(74) *Attorney, Agent, or Firm* — Jennifer R. Knight

(57) ABSTRACT

Disclosed is a plasticizer comprising xylylene glycol di-2-ethylhexanoate. The plasticizer can comprise xylylene glycol di-2ethylhexanoate and a second plasticizer. Also disclosed is a plastisol comprising a PVC resin dispersed in the liquid phase and a plasticizer comprising xylylene glycol di-2-ethylhexanoate and a second plasticizer. Additionally disclosed, an article can comprise the fused plastisol.

23 Claims, 1 Drawing Sheet

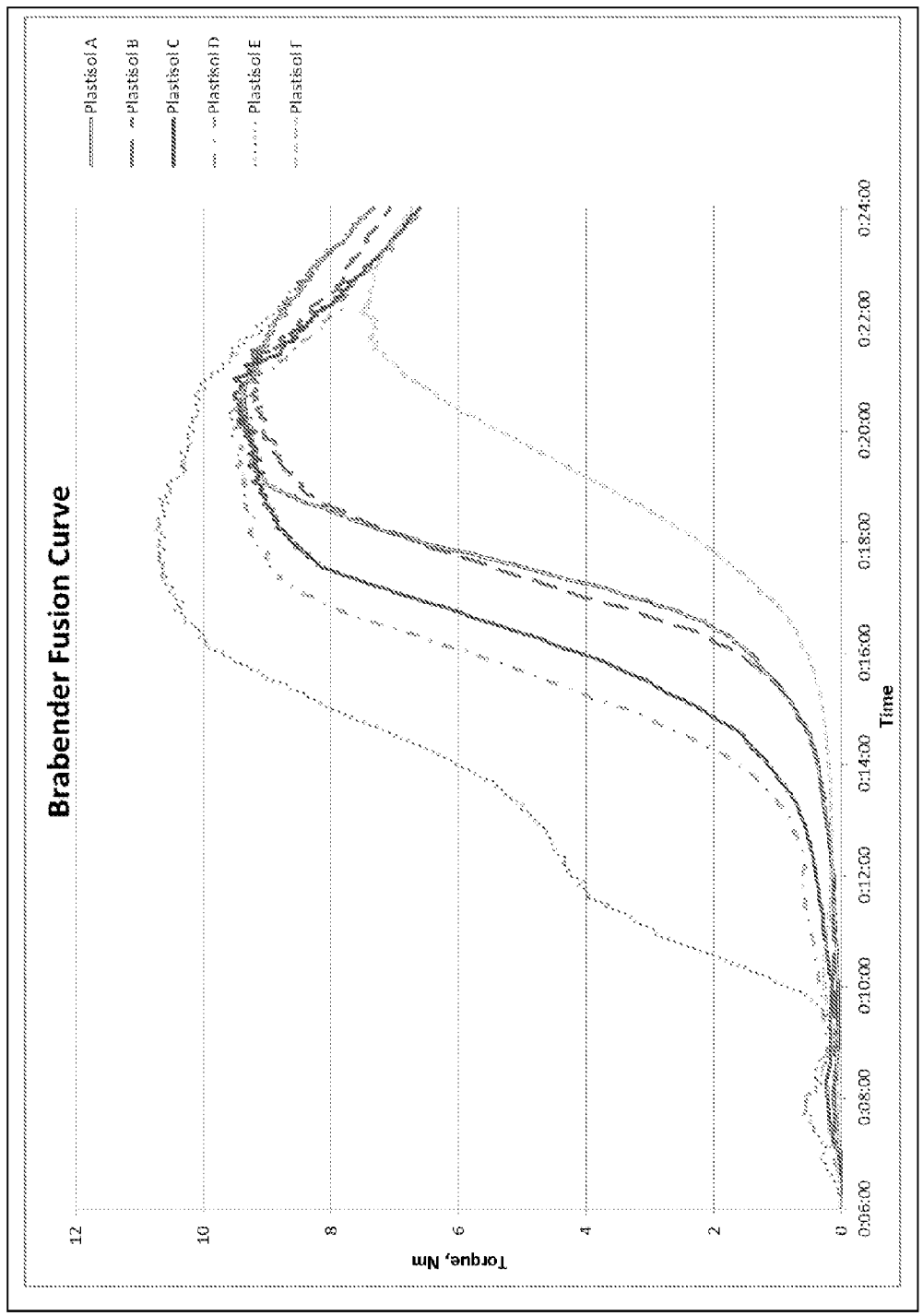
Time Fusion curves for Plastisols A-F

LOW-VOLATILITY PLASTICIZER BLENDS

FIELD OF THE INVENTION

The invention relates to 1,4 diesters of xylylene glycol, more specifically xylylene glycol di-2-ethylhexanoate, to be used as a plasticizer. The invention also relates to a plastisol comprising xylylene glycol di-2-ethylhexanoate and an article made from the plastisol.

BACKGROUND OF THE INVENTION

Many products used in interior applications such as carpet, vinyl tiles, seat covers and shower curtains are made from plastisols. These plastisols often contain a mixture of PVC resin, plasticizers, stabilizers, and other ingredients. Plasticizers are utilized to impact product properties and improve the ease of plastisol processing into the products. Commonly used plasticizers, such as di-2-ethylhexyl terephthalate, diisononyl phthalate, and diisononyl 1,2-cyclohexanedicarboxylate, have a positive impact on the product properties. Plastisols made with only the listed plasticizers, however, can have a high viscosity which impacts ease of processing. In order to reduce the viscosity and improve ease of plastisol processing, a second plasticizer, often referred to as a viscosity reducing plasticizer, can be added to the plastisol.

Common viscosity reducing plasticizers include 2,2,4-trimethyl-1,3 pentanediol diisobutyrate and isononyl benzoate. Over time, these viscosity reducing plasticizers will tend to off-gas from the plastisol and the products made from the plastisol. With growing interest in indoor environmental quality, consumers are increasingly looking to reduce the off-gas from products used in interior applications. Therefore it is the object of this invention to provide a non-volatile viscosity reducing plasticizer which can be used in plastisols which are made into home products.

SUMMARY OF THE INVENTION

A first embodiment of the present invention is a plasticizer comprising xylylene glycol di-2-ethylhexanoate; further, the plasticizer can comprise xylylene glycol di-2-ethylhexanoate and a second plasticizer.

A second embodiment is a plastisol comprising PVC resin dispersed in the liquid phase and a plasticizer. The plasticizer comprises xylylene glycol di-2-ethylhexanoate and a second plasticizer.

A third embodiment is an article comprising a fused plastisol. The plastisol comprises a PVC resin and about 20 parts to about 800 parts plasticizer per 100 parts PVC resin. The plasticizer comprises about 10 weight percent to about 60 weight percent xylylene glycol di-2-ethylhexanoate and about 40 weight percent to about 90 weight percent second plasticizer, each based on the plasticizer total weight.

BRIEF DESCRIPTION OF THE FIGURES

FIG. 1. illustrates the time it takes Plastisols A-F, each made with a different plasticizers, to fuse.

DETAILED DESCRIPTION OF THE INVENTION

A first embodiment of the present invention is a plasticizer comprising xylylene glycol di-2-ethylhexanoate; further, the plasticizer can comprise xylylene glycol di-2-ethylhexanoate and a second plasticizer.

As used herein the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

One embodiment is a plasticizer comprising xylylene glycol di-2-ethylhexanoate. Formula 1 shows the chemical structure of xylylene glycol di-2-ethylhexanoate.

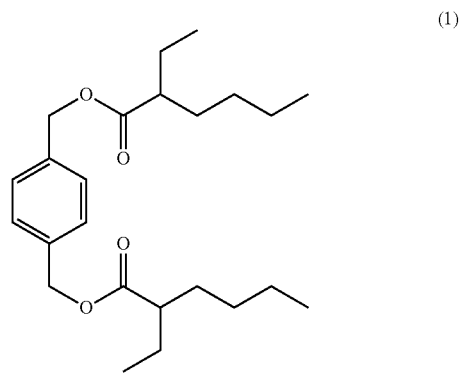 [SMILES: CCCCC(CC)C(=O)OCc1ccc(COC(=O)C(CC)CCCC)cc1]

(1)

In a further embodiment, the plasticizer can comprise a second plasticizer. Examples of a second plasticizer include, but are not limited to, dioctyl phthalate, di-2-ethylhexyl phthalate, diisooctyl phthalate, diisononyl phthalate, di-linear nonyl phthalate, di-linear nonyl, undecyl phthalate, di-linear undecyl phthalate, diisoundecyl phthalate, diisodecyl phthalate, C6-C10 straight-chain phthalates, C7 linear phthalate, C9 linear phthalate, C11 linear phthalate, ditridecyl phthalate, undecyl dodecyl phthalate, di-2-propylheptyl phthalate, nonylundecyl phthalate, Texanol benzyl phthalate, polyester phthalate, diallylphthalate, n-butylphthalyl-n-butyl glycosate, dicapryl phthalate, butylcyclohexyl phthalate, dicyclohexyl phthalate, butyl octyl phthalate, dioctyl terephthalate, di-2-ethylhexyl terephthalate, butyl 2-ethylhexyl terephthalates, dibutyl terephthalate, diisobutyl terephthalate, dioctyl adipate, di-2-ethylhexyl adipate, diisononyl adipate, diisooctyl adipate, diisodecyl adipate, di-tridecyl adipate, dibutoxyethyl adipate, dibutoxyethoxyethyl adipate, di(n-octyl, n-decyl)adipate, polyester adipate, poly glycol adipates, trioctyl trimellitate, tri-2-ethylhexyl trimellitate, triisooctyl trimellitate, triisononyl trimellitate, triisodecyl trimellitate, tri-n-hexyl trimellitate, dioctyl azelate, di-2-ethylhexyl glutarate, di-2-ethylhexyl sebacate, dibutyl sebacate, dibutoxyethyl sebacate, triethyl citrate, acetyl triethyl citrate, tri-n-butyl citrate, acetyl tri-n-butyl citrate, acetyl tri-n-hexyl citrate, butyryl tri-n-hexyl citrate, isononyl benzoate, isodecyl benzoate, 1,4 cyclohexane dimethanol dibenzoate, triethylene glycol di-2-ethylhexanoate, 2,2,4-trimethyl-1,3 pentanediol diisobutyrate, 2,2,-dimethyl-1,3 propanediol dibenzoate, C10-C21 alkane phenol esters or alkyl sulphonic phenol ester, acetic acid reaction products with fully hardened castor oil, pentaerythritol tetrabenzoate, glycerol tribenzoate, polypropylene glycol dibenzoate, polyethylene glycol dibenzoates, triarylphosphates, diisononyl 1,2-cyclohexanedicarboxylate, polymers of adipic acid/phthalates/adipates/sebecates/ with glycols and often acid terminated, butyl benzyl phthalate, alkylbenzyl phthalate, C7-C9 butyl phthalate, diethylene glycol dibenzoate, dipropylene glycol dibenzoate, dibenzoates produced from mixtures of diethylene glycol and/or dipropylene glycol, 2-ethylhexyl benzoate, Texanol benzoate, ethylene glycol dibenzoate, triethylene glycol dibenzoate, di-heptyl phthalate, dihexyl phthalate, dimethyl phthalate, diethyl phthalate, dibutyl phthalate, diisobutyl phthalate, and/or mixtures thereof.

In one embodiment, the second plasticizer comprises, for example, dioctyl terephthalate, diisooctyl phthalate, di-2-ethylhexyl phthalate, di-2-ethylhexyl terephthalate, tri-2-ethylhexyl trimellitate, di-2-propylheptyl phthalate, diisononyl phthalate, diisodecyl phthalate, diisoundecyl phthalate, ditridecyl phthalate, trioctyl trimellitate, triisononyl trimellitate, 2,2,4-trimethyl-1,3-pentanediol diisobutyrate, isononyl benzoate, isodecyl benzoate, diisononyl 1,2-cyclohexanedicarboxylate, dioctyl adipate, di-2-ethylhexyl adipate, triethylene glycol di-2-ethylhexanoate, diethylene glycol dibenzoate, dipropylene glycol dibenzoate, and/or dibenzoates produced from mixtures of diethylene glycol and dipropylene glycol. In an additional embodiment, the second plasticizer comprises, for example, dioctyl terephthalate, di-2-ethylhexyl terephthalate, dioctyl adipate, di-2-ethylhexyl adipate, and/or triethylene glycol di-2-ethylhexanoate. In another embodiment, the second plasticizer comprises, for example, di-2-ethylhexyl terephthalate, diisononyl phthalate, and/or diisononyl 1,2-cyclohexanedicarboxylate.

Xylylene glycol di-2-ethylhexanoate and the second plasticizer can be present over a wide range of weight percentage values within the plasticizer. In the following examples and herein after, the weight percentage of xylylene glycol di-2-ethylhexanoate and second plasticizer are each based on the total weight of the plasticizer. In one example, the plasticizer comprises about 10 weight percent to about 60 weight percent xylylene glycol di-2-ethylhexanoate and about 40 weight percent to about 90 weight percent second plasticizer. In further examples, the plasticizer comprises about 10 weight percent to about 50 weight percent xylylene glycol di-2-ethylhexanoate and about 50 weight percent to about 90 weight percent second plasticizer; about 10 weight percent to about 40 weight percent xylylene glycol di-2-ethylhexanoate and about 60 weight percent to about 90 weight percent second plasticizer; about 10 weight percent to about 30 weight percent xylylene glycol di-2-ethylhexanoate and about 70 weight percent to about 90 weight percent second plasticizer; or about 10 weight percent to about 20 weight percent xylylene glycol di-2-ethylhexanoate and about 80 weight percent to about 90 weight percent second plasticizer.

Xylylene glycol di-2-ethylhexanoate can be synthesized via different routes as known to one skilled in the art. For example xylylene glycol di-2-ethylhexanoate can be synthesized from the diesterification of xylylene glycol with 2-ethylhexanonyl chloride, as shown in Example 1, or from the diesterification of xylylene glycol with 2-ethylhexanoic acid, as shown in Example 2.

A second embodiment is a plastisol comprising a plasticizer and a PVC resin, dispersed in the liquid phase. The plasticizer comprises xylylene glycol di-2-ethylhexanoate and a second plasticizer. The types of PVC plastic resins that can be used include, but are not limited to, homopolymers of polyvinyl chloride resin(s), copolymers of vinyl chloride resin(s), and/or mixtures thereof.

The plastisol can comprise any of the second plasticizers and any range of weight percentages of xylylene glycol di-2-ethylhexanoate and second plasticizer described herein above. For example, the second plasticizer can comprise dioctyl terephthalate, diisooctyl phthalate, di-2-ethylhexyl phthalate, di-2-ethylhexyl terephthalate, tri-2-ethylhexyl trimellitate, di-2-propylheptyl phthalate, diisononyl phthalate, diisodecyl phthalate, diisoundecyl phthalate, ditridecyl phthalate, trioctyl trimellitate, triisononyl trimellitate, 2,2,4-trimethyl-1,3-pentanediol diisobutyrate, isononyl benzoate, isodecyl benzoate, diisononyl 1,2-cyclohexanedicarboxylate, dioctyl adipate, di-2-ethylhexyl adipate, triethylene glycol di-2-ethylhexanoate, diethylene glycol dibenzoate, dipropylene glycol dibenzoate, and/or dibenzoates produced from mixtures of diethylene glycol or dipropylene glycol. In a further embodiment, the second plasticizer comprises, for example, dioctyl terephthalate, di-2-ethylhexyl terephthalate, dioctyl adipate, di-2-ethylhexyl adipate, and/or triethylene glycol di-2-ethylhexanoate. In a further embodiment, the second plasticizer comprises, for example, di-2-ethylhexyl terephthalate, diisononyl phthalate, and/or diisononyl 1,2-cyclohexanedicarboxylate.

In a further embodiment, the viscosity of the plastisol ranges from about 500 centipoise to about 3000 centipoise. In other examples, the viscosity ranges from about 500 centipoise to about 2000 centipoise or about 500 centipoise to about 1500 centipoise.

In another embodiment, the amount of plasticizer used in the plastisol ranges from about 20 parts to about 800 parts plasticizer per 100 parts PVC resin. Further examples of plasticizer to PVC resin ranges include about 20 parts to about 400 parts plasticizer per 100 parts PVC resin, about 20 parts to about 200 parts plasticizer per 100 parts PVC resin, about 20 parts to about 100 parts plasticizer per 100 parts PVC resin, about 40 parts to about 800 parts plasticizer per 100 parts PVC resin, about 40 parts to about 400 parts plasticizer per 100 parts PVC resin, about 40 parts to about 200 parts plasticizer per 100 parts PVC resin, or about 40 parts to about 100 parts plasticizer per 100 parts PVC resin.

The plastisol comprises a plasticizer comprising xylylene glycol di-2-ethylhexanoate and a second plasticizer. Weight percentages for xylylene glycol di-2-ethylhexanoate and the second plasticizer are each determined based on the total weight of the plasticizer. For example, the plasticizer can comprise about 10 weight percent to about 60 weight percent xylylene glycol di-2-ethylhexanoate and about 40 weight percent to about 90 weight percent second plasticizer. In further examples, the plasticizer can comprise about 10 weight percent to about 50 weight percent xylylene glycol di-2-ethylhexanoate and about 50 weight percent to about 90 weight percent second plasticizer; about 10 weight percent to about 40 weight percent xylylene glycol di-2-ethylhexanoate and about 60 weight percent to about 90 weight percent second plasticizer; about 10 weight percent to about 30 weight percent xylylene glycol di-2-ethylhexanoate and about 70 weight percent to about 90 weight percent second plasticizer; or about 10 weight percent to about 20 weight percent xylylene glycol di-2-ethylhexanoate and about 80 weight percent to about 90 weight percent second plasticizer.

In another embodiment, the amount of plasticizer used ranges from about 20 parts to about 800 parts per 100 parts PVC resin, and the plasticizer comprises xylylene glycol di-2-ethylhexanoate and a second plasticizer in different weight percentages. For example, the plasticizer can comprise about 10 weight percent to about 60 weight percent xylylene glycol di-2-ethylhexanoate and about 40 weight percent to about 90 weight percent second plasticizer; 10 weight percent to about 50 weight percent xylylene glycol di-2-ethylhexanoate and about 50 weight percent to about 90 weight percent second plasticizer; about 10 weight percent to about 40 weight percent xylylene glycol di-2-ethylhexanoate and about 60 weight percent to about 90 weight percent second plasticizer; about 10 weight percent to about 30 weight percent xylylene glycol di-2-ethylhexanoate and about 70 weight percent to about 90 weight percent second plasticizer; or about 10 weight percent to about 20 weight percent xylylene glycol di-2-ethylhexanoate and about 80 weight percent to about 90 weight percent second plasticizer.

In a further embodiment, the amount of plasticizer used ranges from about 20 parts to about 200 parts per 100 parts PVC resin, and the plasticizer comprises xylylene glycol di-2-ethylhexanoate and a second plasticizer, each in different weight percentages. For example, the plasticizer can comprise about 10 weight percent to about 60 weight percent xylylene glycol di-2-ethylhexanoate and about 40 weight percent to about 90 weight percent second plasticizer; about 10 weight percent to about 50 weight percent xylylene glycol di-2-ethylhexanoate and about 50 weight percent to about 90 weight percent second plasticizer; about 10 weight percent to about 40 weight percent xylylene glycol di-2-ethylhexanoate and about 60 weight percent to about 90 weight percent second plasticizer; about 10 weight percent to about 30 weight percent xylylene glycol di-2-ethylhexanoate and about 70 weight percent to about 90 weight percent second plasticizer; or about 10 weight percent to about 20 weight percent xylylene glycol di-2-ethylhexanoate and about 80 weight percent to about 90 weight percent second plasticizer.

In a further embodiment, the amount of plasticizer used ranges from about 40 parts to about 100 parts per 100 parts PVC resin, and the plasticizer comprises xylylene glycol di-2-ethylhexanoate and a second plasticizer. The plasticizer comprises about 10 weight percent to about 30 weight percent xylylene glycol di-2-ethylhexanoate and about 70 weight percent to about 90 weight percent second plasticizer. The second plasticizer is selected from the group of plasticizers consisting of di-2-ethylhexyl terephthalate, diisononyl phthalate, and diisononyl 1,2-cyclohexanedicarboxylate. The plastisol has a viscosity from about 500 centipoise to about 2000 centipoise.

In addition to PVC resin and plasticizer, stabilizers and other additives can be added to the plastisol. Stabilizers provide protection against deficient PVC homopolymerization and copolymerization, and functions to eliminate or retard the process of polymer degradation. Stabilizers can be used in a range of about 1 part to about 10 parts per 100 parts PVC resin, or preferably about 1 part to about 5 parts per 100 parts PVC resin. The following stabilizers can be used individually or in combination, stabilizers include metal soaps, organic phosphites, epoxy compounds, tin stabilizers, and mixtures thereof. Metal soap stabilizers include but are not limited to zinc stearate, barium stearate, calcium stearate, cadmium stearate, barium ricinolate, calcium oleate, calcium laurelate, zinc octoate and mixtures thereof. Epoxy compound stabilizers include, epoxy soybean oil, epoxy linseed oil, epoxy polybutadiene, epoxy methylstearate, epoxy 2-ethylhexyl stearate, epoxy stearyl stearate, bis-phenol A diglycidyl ether, vinyl dicyclohexanediepoxide, 2,2-bis-(4-hydroxyphenol) propane and epichlorohydrine condensation copolymerization, and mixtures thereof. Organic phosphite stabilizers include diphenyldecyl phosphite, triphenyl phosphite, tris-nonylphenyl phosphite, tri-stearyl phosphite, octyldiphenyl phosphite, and mixtures thereof. Tin stabilizers include tin dilaurate, dibutyl tin maleate, organic tin mercaptide and organic tin sulfonic amide, and/or mixtures thereof. Other additives may be added to affect physical properties of the plastisol. Examples include, flame retardants, when additional flammability resistance is desired, and/or pigments and other colorants. Additional additives include but are not limited to, mineral fillers, lubricants, crosslinking agents, and/or adhesion promoters.

Plastisols are made via the mixing, in a device such as a FlackTex mixer, of plastic resins, stabilizers, plasticizers, and other additives, as shown in Example 5.

A plastisol can be used to make an article. The type of article can include the following non-limiting examples, resilient vinyl flooring, floor tiles, fabric coating, adhesives, vinyl foams, home furnishings, toys and child care articles, gloves, shoes, building and construction, automotive, apparel, recreation, tools, novelties, vinyl wall coverings, etc.

A third embodiment of the invention is an article comprising a fused plastisol. The plastisol comprises a PVC resin and about 20 parts to about 800 parts plasticizer per 100 parts PVC resin. The plasticizer comprises about 10 weight percent to about 60 weight percent xylylene glycol di-2-ethylhexanoate and about 40 weight percent to about 90 weight percent second plasticizer, each based on the total weight of the plasticizer. All of the features of the plastisol, including second plasticizer options, amounts of xylylene glycol di-2-ethylhexanoate and second plasticizer, amounts of plasticizer per 100 parts PVC resin, and plastisol viscosity, described herein above apply to the article comprising a fused plastisol.

In one embodiment, the second plasticizer comprises, for example, dioctyl terephthalate, diisooctyl phthalate, di-2-ethylhexyl phthalate, di-2-ethylhexyl terephthalate, tri-2-ethylhexyl trimellitate, di-2-propylheptyl phthalate, diisononyl phthalate, diisodecyl phthalate, diisoundecyl phthalate, ditridecyl phthalate, trioctyl trimellitate, triisononyl trimellitate, 2,2,4-trimethyl-1,3-pentanediol diisobutyrate, isononyl benzoate, isodecyl benzoate, diisononyl 1,2-cyclohexanedicarboxylate, dioctyl adipate, di-2-ethylhexyl adipate, triethylene glycol di-2-ethylhexanoate, diethylene glycol dibenzoate, dipropylene glycol dibenzoate, and/or dibenzoates produced from mixtures of diethylene glycol and dipropylene glycol. In a further, embodiment the second plasticizer, comprises, for example, di-2-ethylhexyl terephthalate, diisononyl phthalate, and/or diisononyl 1,2-cyclohexanedicarboxylate.

In a further embodiment, the article comprises a fused plastisol, wherein the plastisol comprises a plasticizer comprising about 10 weight percent to about 30 weight percent xylylene glycol di-2-ethylhexanoate and about 70 weight percent to about 90 weight percent second plasticizer. The plastisol has a viscosity from about 500 centipoise to about 3000 centipoise.

In a further embodiment of the invention, the article formed can be resilient vinyl flooring, floor tiles, fabric coating, adhesives, vinyl foams, home furnishings, toys and child care articles, gloves, shoes, building and construction, automotive, apparel, recreation, tools, novelties, and/or vinyl wall coverings.

Articles can be made from plastisols in a variety of methods including, for example, spraying, rotational molding, slush molding, and/or mold casting the plastisol.

EXAMPLES

The following compounds are commercially available and were used without further processing; 1,4-xylylene glycol, pyridine, DMAP, 2-ethylhexanonyl chloride, 2-ethylhexanoic acid, titanium isopropoxide, isobutyryl chloride, phenylenedimethanol, levulinic acid, dichloromethane, diisopropyl carbodiimide, Tenax® TA absorbent resin, Geon™ 121A PVC, epoxidized soybean oil, Ackrostab® LT 4798 barium/zinc stabilizer, di-2-ethylhexyl terephthalate (Eastman 168™ non-Phthalate Plasticizer), 2,2,4-trimethyl-1,3 pentanediol diisobutyrate (Eastman TXIB™ Formulation Additive), diisononyl phthalate, and isononyl benzoate (Evonik Vestinol™ INB).

Flash point analysis was conducted on a SetaFlash 82000 instrument. The cell was preheated to a temperature at least 18° C. lower than the expected flash point. 2 ml of sample was inserted through the injection port and heated at a rate of 2° C./min. An ignition source (flame) was applied every 1° C. until a flash was observed. If the sample flashed upon introduction to the instrument the preheated temperature was lowered an additional 18° C. and the process was repeated. This process was continued until a flash point was observed or all materials were exhausted. The final value was corrected for atmospheric pressure.

Boiling point test was run on a Mettler-Toledo FP90 Central Processor with a Mettler FP81HT MBC cell. A small amount of sample was added to a glass tube with a boiling capillary. The tube was inserted into the Mettler cell and heated at a rate of 1° C. per minute until the software detected a boiling point. The final value was corrected for atmospheric pressure.

Thermogravimetric Analysis was determined according to ASTM Method D 3850 except the scanning rate was 20° C./min. The test was conducted with a TA Instruments model Q500 Thermogravimetric Analyzer.

Volatility testing was conducted according to the ISO 16000-6 method using gas chromatography. Total volatile organic compounds (TVOC) is the sum of volatile organic compounds, sampled on Tenax® TA absorbent resin, which elute from a non-polar or slightly polar gas chromatographic separation column between and including n-hexane and n-hexadecane (n-$C_6$-n-$C_{16}$). If the compound elutes at or before n-hexadecane (n-$C_{16}$) it is classified as a volatile organic compound (VOC). If the compound elutes between n-hexadecane (n-$C_{16}$) and n-docosane (n-$C_{22}$) it is classified as semi-VOC. If the compound elutes after n-docosane (n-$C_{22}$) then it is classified as non-VOC.

Viscosity measurements for liquid solutions were run using a TA Instruments Advanced Rheometer 2000 (AR 2000). The specific fixtures were a 40 mm plate and a flat plate. The fixture applied a shear to the liquid on the surface (plate). Viscosity was measured as shear (up to 100 sec$^{-1}$) was applied to the sample. The torque range was 0.1 micro Nm-200 micro Nm. There is a possibility of noise in the data at low shear rates (<10 sec$^{-1}$).

Shore A Hardness was determined using ASTM Method D2240, Standard Test for Rubber Property.

Exudation was determined using ASTM method D3291-97, standard practice for compatibility of plasticizers in poly (vinyl chloride) plastics under compression.

Examples 1-4 detail the synthesis of xylylene glycol diesters.

Example 1

Synthesis of Xylylene Glycol Di-2-Ethylhexanoate (XG-2EH)

1,4-xylylene glycol (5 g, 0.036 mol), pyridine (5.69 g, 0.072 mol) and the catalyst DMAP (ca. 100 mg), in a solution of dichloromethane (50 ml), were added to a flask. The flask was chilled in an ice bath. 2-ethylhexanonyl chloride (11.74 g, 0.072 mol) was added drop wise to the mixture. The mixture was then allowed to come to room temperature. It was stirred overnight. The mixture was washed with 1M HCl and brine. The organic layer was dried over MgSO$_4$ and concentrated in vacuo to afford a clear oil (ca. 13 g), which was then purified by column chromatography (10 g). Its purity was ascertained using $^1$H NMR (300 MHz in CDCL$_3$): δ 7.35 (s, 4H), 5.12 (s, 4H), 2.32 (m, 2H), 1.68-1.41 (m 8H), 1.24 (m 8H), 0.87 (m, 12H).

Example 2

Large Batch Synthesis of Xylylene Glycol Di-2-Ethylhexanoate (XG-2EH)

1,4-xylylene glycol (89.7 g, 0.65 mol), 2-ethylhexanoic acid (205.92 g, 1.43 mol, 2.2 eq), and toluene (250 ml) were added to a 3-neck 1 L flask with a Dean-Stark trap. Titanium isopropoxide (9.23 g, 0.0325 mol, 5 mol %), a catalyst, was added to the suspension. The reaction mixture was heated to reflux. 1,4-xylylene glycol dissolved to afford a clear yellow solution at ca. 75° C. The reaction was held at a temperature of ca. 120° C. for more than 24 hours to remove water (23.4 g). The product was washed with sodium bicarbonate and brine. It was then purified using Kugelrohr distillation. The clear liquid product had a mass of ca. 200 g.

Example 3

Synthesis of 1,4-Iso-Butyric Xylylene Glycol (XG-2IB)

1,4-xylylene glycol (5 g, 0.0306 mol), pyridine (5.7 g, 0.072 mol), and catalyst DMAP (ca. 100 mg) in a solution of dichloromethane (ca. 25 ml) were added to a flask. Isobutyryl chloride (7.71 g, 0.072 mol) was then added to the solution drop wise. The mixture was stirred overnight. 1M HCL brine was used to wash the mixture. The organic layer was dried over MgSO$_4$ and concentrated in vacuo to afford a clear oil as the product (9 g). Its purity was ascertained using $^1$H NMR (300 MHz in CDCL$_3$): δ 7.34 (s, 4H), 5.11 (s, 4H), 2.60 (sept, 2H), 1.19 (d, 12H).

Example 4

Synthesis of 1,4-Levulinic Xylylene Glycol (XG-2LA)

In a flask with dichloromethane (ca. 25 ml), 1,4-phenylene-dimethanol (5 g, 0.036 mol) and levulinic acid (8.36 g, 0.072 mol) were mixed. The flask was then cooled in an ice water bath. Diisopropyl carbodiimide (9.09 g, 0.072 mol) and the catalyst DMAP (ca. 100 mg) were then added slowly to the solution. The mixture was allowed to come to room temperature and was stirred overnight. The mixture was then filtered and washed with 1M HCL brine. It was then dried over MgSO$_4$ and concentrated in vacuo to afford a white solid as the product (9.5 g). Its purity was ascertained using $^1$H NMR (300 MHZ in CDCL$_3$): δ 7.34 (s, 4H), 5.11 (s, 4H), 2.77 (t, 4H), 2.62 (t, 4H), 2.18 (s, 6H).

Flash point, boiling point, and viscosity analyses were conducted on XG-2EH, XG-2IB, and XG-2LA to determine the physical properties of those compounds. The results were then compared to di-2-ethylhexyl terephthalate (DEHT), 2,2,4-trimethyl-1,3 pentanediol diisobutyrate (TXIB), and diisononyl phthalate (DOP). Thermogravimetric analysis was conducted on XG-2EH and XG-2IB to determine thermostability. The results were compared to the thermostability of DEHT and TXIB. Volatility analysis was conducted on XG-2EH to determine its classification as either a volatile organic compound (VOC), semi volatile organic compound (semi-VOC), or non-volatile organic compound (non-VOC). The results were compared to TXIB and isononyl benzoate (INB).

Table 1 shows XG-2EH and XG-2IB exhibit lower viscosity than DEHT and DOP. XG-2EH exhibits a flash point at 212° C., higher than the flash point of TXIB, 143° C.

TABLE 1

Physical Property comparison of XG-2EH, XG-IB, XG-LA, and common commercially available plasticizers

| Plasticizer | Flash Point (° C.) | Boiling Point at 760 mm Hg (° C.) | Viscosity at a shear rate of 10 sec$^{-1}$ and 25° C. (Poise) |
|---|---|---|---|
| DOP | 216 | 384 | 0.56 |
| DEHT | 238 | 375 | 0.71 |
| TXIB | 143 | 280 | 0.09 |
| XG-2EH | 212 | 302.6[1] | 0.19 |
| XG-2IB | <170° C.[2] | >320° C. | 0.036 |
| XG-2LA | 156° C. | >330° C. | n/a[3] |

[1] measured at 80 mm Hg because unknown at the time whether XG-2EH molecules would degrade before boiling point was reached
[2] flashed at onset temperature of 170° C., due to material limitations further flash point analysis could not be conducted on XG-2IB
[3] was a solid Table 2 shows XG-2EH exhibits lower volatility than TXIB. The temperature at which 90 wt % remains in air was 242.4° C. for XG-2EH as compared to 130.2° C. for TXIB. The temperature at which 0 wt % remains in air was 315° C. for XG-2EH and was 191.5° C. for TXIB. After 1 hr at 120° C. and 150° C. in air, 98.8 wt % and 92.4 wt % of XG-2EH remained, respectively. At the same conditions, TXIB completely evaporated in less than 48 minutes and 38 minutes, respectively.

TABLE 2

Thermogravimetric analysis of XG-2EH, XG-2IB, and common commercially available plasticizers

| | DENT | | XG-2EH | | TXIB | | XG-2IB | |
|---|---|---|---|---|---|---|---|---|
| | Air | Nitrogen | Air | Nitrogen | Air | Nitrogen | Air | Nitrogen |
| Temperature at which 90 wt % remains (° C.) | 259.7 | 251.7 | 242.4 | 248.8 | 130.2 | 129.2 | 204.5 | 209.4 |
| Temperature at which less than 10 wt % remains (° C.) | 315 | 315 | 315 | 310 | 191.5 | 190.9 | 275 | 285 |
| Wt % remaining after 1 hour at 120° C. | 99.7 | 99.7 | 98.8 | 98.8 | 0[1] | 0.6[2] | 92.3 | 89.7 |
| Wt % remaining after 1 hour at 150° C. | 98.1 | 98.1 | 92.4 | 95.2 | 0[3] | 0[4] | 69.9 | 67.2 |

[1] after 47.7 minutes
[2] after 37.5 minutes
[3] after 12.1 minutes
[4] after 11.5 minutes Table 3 shows XG-2EH is classified as a non-volatile organic compound (non-VOC) whereas TXIB is classified as a volatile organic compound (VOC) and INB is classified as a semi volatile organic compound (semi-VOC).

TABLE 3

ISO 16000 volatility testing results

| Compound | Classification |
|---|---|
| TXIB | VOC |
| INB | Semi-VOC |
| XG-2EH | Non-VOC |

Example 5

Preparation of Plastisols

Plastisol A

Plastisol with Plasticizer Comprising Di-2-Ethylhexyl Terephthalate (DEHT)

A plastisol composition comprising DEHT was prepared. 60 parts DEHT were added to 100 parts resin (Geon™ 121A PVC). Additionally 3 parts epoxidized soybean oil per 100 parts resin and 3 parts Akcrostab® LT-4798 barium/zinc stabilizer per 100 parts resin were added. First, the liquid ingredients were weighed and added to a FlackTex mixer followed by the PVC ingredients. A first mix was conducted at 1200 rpm for 45 seconds. The temperature was kept below 29° C. A second mix was conducted at 1600 rpm for 45 seconds. The temperature was kept below 32° C. The plastisol was deaerated for 20 minutes at <25 torr.

Plastisol B

Plastisol with Plasticizer Comprising Xylylene Glycol Di-2-Ethylhexanoate (XG-2EH) and DEHT A plastisol composition comprising XG-2EH and DEHT was prepared. 45 parts DEHT and 15 parts XG-2EH were added to 100 parts resin (Geon™ 121A PVC). Additionally 3 parts epoxidized soybean oil per 100 parts resin and 3 parts Akcrostab® LT-4798 barium/zinc stabilizer per 100 parts resin were added. First, the liquid ingredients were weighed and added to a FlackTex mixer followed by the PVC ingredients. A first mix was conducted at 1200 rpm for 45 seconds. The temperature was kept below 29° C. A second mix was conducted at 1600 rpm for 45 seconds. The temperature was kept below 32° C. The plastisol was deaerated for 20 minutes at <25 torr.

Plastisol C

Plastisol with Plasticizer Comprising 2,2,4-Trimethyl-1,3 Pentanediol Diisobutyrate (TXIB) and DEHT Plastisol C was prepared using the same method as Plastisol B except the plasticizer TXIB was substituted for XG-2EH.

Plastisol D

Plastisol with Plasticizer Comprising Isononyl Benzoate (Evonik Vestinol™ INB) and DEHT Plastisol D was prepared using the same method as Plastisol B except the plasticizer INB was substituted for XG-2EH.

Plastisol E

Plastisol with Plasticizer Comprising Di-2-Ethylhexyl Phthalate (DOP)

Plastisol E was prepared using the same method as Plastisol A except the plasticizer DOP was substituted for the plasticizer DEHT.

Plastisol F

Plastisol with Plasticizer Comprising Xylylene Glycol Di-2-Ethylhexanoate (XG-2EH)

Plastisol F was prepared using the same method as Plastisol A, except XG-2EH was substituted for the plasticizer DEHT.

Table 4 and Table 5 show XG-2EH is effective at lowering the viscosity of a plastisol containing DEHT. Considering Table 4, for example, Plastisol A, with DEHT as the only plasticizer, had a viscosity of 4850 centipoise after 7 days, whereas Plastisol B, a plastisol with a blend of plasticizers DEHT and XG-2EH, had a viscosity of 1860 centipoise after 7 days.

TABLE 4

Brookfield Viscosity of Example 5 plastisols over time at 20 rpm

| | Days | | | |
|---|---|---|---|---|
| | 0 | 1 | 3 | 7 |
| Plastisol A (cP) | 4500 | 4840 | 4880 | 4850 |
| Plastisol B (cP) | 1660 | 1840 | 1850 | 1860 |
| Plastisol C (cP) | 1360 | 1500 | 1560 | 1640 |
| Plastisol D (cP) | 1320 | 1560 | 1660 | 1660 |
| Plastisol E (cP) | 6380 | 7300 | 7570 | 7900 |
| Plastisol F (cP) | 1150 | 1040 | 1000 | 990 |

TABLE 5

Brookfield Viscosity of Example 5 plastisols over time at 2 rpm

| | Days | | | |
|---|---|---|---|---|
| | 0 | 1 | 3 | 7 |
| Plastisol A (cP) | 6500 | 5280 | 550 | 5560 |
| Plastisol B (cP) | 1600 | 1800 | 1840 | 1840 |
| Plastisol C (cP) | 1420 | 1540 | 1640 | 1700 |
| Plastisol D (cP) | 1400 | 1560 | 1700 | 1740 |
| Plastisol E (cP) | 10200 | 11200 | 11220 | 11600 |
| Plastisol F (cP) | 1300 | 1120 | 1100 | 1100 |

Shore A Hardness of a plastic article is a product property. The different effects of different plasticizers on this product property can be compared. Table 6 shows an article formed from a plastisol containing mixture of XG-2EH and DEHT had comparable hardness to an article formed from a plastisol containing pure DEHT. The Shore A Hardness of an article formed from Plastisol B was 72, and the Shore A hardness of an article formed from Plastisol A, was 73.5. Additionally the articles containing blends of a viscosity reducing plasticizer and DEHT had comparable Shore A Hardness values. An article formed from Plastisol B had a Shore A Hardness of 72, an article formed from Plastisol C had a Shore A Hardness of 71, and an article formed from Plastisol D had a Shore A Hardness of 70.

TABLE 6

Shore A Hardness of articles formed from Example 5 plastisols

| Article formed from: | Shore A Hardness avg. | Std. Deviation |
|---|---|---|
| Plastisol A | 73.5 | 1.4 |
| Plastisol B | 72 | 0.7 |
| Plastisol C | 71 | 0.3 |
| Plastisol D | 70 | 0.7 |
| Plastisol E | 71.0 | 1.0 |
| Plastisol F | 76.7 | 0.9 |

Exudation is another measure of plasticizer effect on end product properties. Table 7 shows an article formed from Plastisol F was more prone to exudation than either articles formed from Plastisol A or Plastisol E.

TABLE 7

Exudation characteristics of articles formed from Example 5 plastisols[1]

| Articles formed from: | 0.2 Days | 1 Day | 7 Days |
|---|---|---|---|
| Plastisol A | 1.0 | 0.0 | 0.7 |
| Plastisol E | 0.0 | 0.0 | 0.3 |
| Plastisol F | 2.0 | 3.0 | 2.3 |

[1]Numerical scale for exudation amount
0 = none
1 = slight
2 = moderate
3 = heavy/dripping Based upon the above analyses of plastisols and articles made therefrom, XG-2EH can serve as a non-volatile substitute for TXIB as a viscosity reducing plasticizer. XG-2EH was classified as a NVOC, as shown in Table 3, and was less volatile than TXIB, as shown in Table 2. Plastisol B, a blend of DEHT and XG-2EH, had a viscosity of 1860 centipoise after 7 days at 20 rpm. Plastisol C, a blend of DEHT and TXIB, had a viscosity of 1640 after 7 days at 20 rpm. Plastisol A, containing only DEHT as a plasticizer, had a viscosity of 4850 centipoise after 7 days at 20 rpm. Additionally, an article formed from Plastisol B had a Shore A Hardness of 72, comparable to an article formed from Plastisol C, which had a Shore A Hardness of 71. Both XG-2EH and TXIB can lower the viscosity of a plastisol containing DEHT with similar effect on the end product. Therefore XG-2EH can be utilized as a viscosity reducing plasticizer as XG-2EH imparts similar properties to a plastisol as TXIB, but XG-2EH has the advantage of being non-volatile.

It is not intended the scope of the invention is to be limited by the Examples described and illustrated above, but instead it is intended the scope of the invention will be determined by the appended claims and their equivalents.

What is claimed is:

1. A plasticizer comprising xylylene glycol di-2-ethylhexanoate.

2. The plasticizer of claim 1 further comprising a second plasticizer.

3. The plasticizer of claim 2 wherein said second plasticizer comprises dioctyl terephthalate, diisooctyl phthalate, di-2-ethylhexyl phthalate, di-2-ethylhexyl terephthalate, tri-2-ethylhexyl trimellitate, di-2-propylheptyl phthalate, diisononyl phthalate, diisodecyl phthalate, diisoundecyl phthalate, ditridecyl phthalate, trioctyl trimellitate, tri-isononyl trimellitate, 2,2,4-trimethyl-1,3-pentanediol diisobutyrate, isononyl benzoate, isodecyl benzoate, diisononyl 1,2-cyclohexanedicarboxylate, dioctyl adipate, di-2-ethylhexyl adipate, triethylene glycol di-2-ethylhexanoate, diethylene glycol dibenzoate, dipropylene glycol dibenzoate, and/or dibenzoates produced from mixtures of diethylene glycol and dipropylene glycol.

4. The plasticizer of claim 2 wherein said second plasticizer comprises dioctyl terephthalate, di-2-ethylhexyl terephthalate, dioctyl adipate, di-2-ethylhexyl adipate, and/or triethylene glycol di-2-ethylhexanoate.

5. The plasticizer of claim 2 wherein said second plasticizer comprises di-2-ethylhexyl terephthalate, diisononyl phthalate, and/or diisononyl 1,2-cyclohexanedicarboxylate.

6. The plasticizer of claim 2 comprising about 10 weight percent to about 60 weight percent said xylylene glycol di-2-ethylhexanoate and about 40 weight percent to about 90 weight percent said second plasticizer, each based on the total weight of said plasticizer.

7. The plasticizer of claim 2 comprising about 10 weight percent to about 30 weight percent said xylylene glycol di-2-ethylhexanoate and about 70 weight percent to about 90 weight percent said second plasticizer, each based on the total weight of said plasticizer.

8. A plastisol comprising a plasticizer and a PVC resin dispersed in said plasticizer and wherein said plasticizer comprises xylylene glycol di-2-ethylhexanoate and a second plasticizer.

9. The plastisol of claim 8 wherein said second plasticizer comprises dioctyl terephthalate, diisooctyl phthalate, di-2-ethylhexyl phthalate, di-2-ethylhexyl terephthalate, tri-2-ethylhexyl trimellitate, di-2-propylheptyl phthalate, diisononyl phthalate, diisodecyl phthalate, diisoundecyl phthalate, ditridecyl phthalate, trioctyl trimellitate, triisononyl trimellitate, 2,2,4-trimethyl-1,3-pentanediol diisobutyrate, isononyl benzoate, isodecyl benzoate, diisononyl 1,2-cyclohexanedicarboxylate, dioctyl adipate, di-2-ethylhexyl adipate, triethylene glycol di-2-ethylhexanoate, diethylene glycol dibenzoate, dipropylene glycol dibenzoate, and/or dibenzoates produced from mixtures of diethylene glycol and dipropylene glycol.

10. The plastisol of claim 8 wherein said second plasticizer comprises dioctyl terephthalate, di-2-ethylhexyl terephthalate, dioctyl adipate, di-2-ethylhexyl adipate, and/or triethylene glycol di-2-ethylhexanoate.

11. The plastisol of claim 8 wherein said second plasticizer comprises di-2-ethylhexyl terephthalate, diisononyl phthalate, and/or diisononyl 1,2-cyclohexanedicarboxylate.

12. The plastisol of claim 8 wherein the amount of said plasticizer ranges from about 20 parts to about 800 parts per 100 parts of said PVC resin.

13. The plastisol of claim 8 wherein the amount of said plasticizer ranges from about 20 parts to about 200 parts per 100 parts of said PVC resin.

14. The plastisol of claim 12 wherein said plasticizer comprises about 10 weight percent to about 60 weight percent said xylylene glycol di-2-ethylhexanoate and about 40 weight percent to about 90 weight percent said second plasticizer, each based on the total weight of said plasticizer.

15. The plastisol of claim 12 wherein said plasticizer comprises about 10 weight percent to about 30 weight percent said xylylene glycol di-2-ethylhexanoate and about 70 weight percent to about 90 weight percent said second plasticizer, each based on the total weight of said plasticizer.

16. The plastisol of claim 13 wherein said plasticizer comprises about 10 weight percent to about 60 weight percent said xylylene glycol di-2-ethylhexanoate and about 40 weight percent to about 90 weight percent said second plasticizer, each based on the total weight of said plasticizer.

17. The plastisol of claim 13 wherein said plasticizer comprises about 10 weight percent to about 30 weight percent said xylylene glycol di-2-ethylhexanoate and about 70 weight percent to about 90 weight percent said second plasticizer, each based on the total weight of said plasticizer.

18. The plastisol of claim 8,
wherein the amount of said plasticizer ranges from about 40 parts to about 100 parts per 100 parts of said PVC resin;
wherein said plasticizer comprises about 10 weight percent to about 30 weight percent xylene glycol di-2-ethylhexanoate, and about 70 weight percent to about 90 weight percent said second plasticizer, each based on the total weight of said plasticizer;
wherein said second plasticizer comprises di-2-ethylhexyl terephthalate, diisononyl phthalate, and/or diisononyl 1,2-cyclohexanedicarboxylate.

19. An article comprising a fused plastisol,
wherein said plastisol comprises a plasticizer and a PVC resin dispersed in said plasticizer wherein said plasticizer comprises xylylene glycol di-2-ethylhexanoate and a second plasticizer;
wherein the amount of said plasticizer ranges from about 20 parts to about 800 parts per 100 parts of said PVC resin; and
wherein said plasticizer comprises about 10 weight percent to about 60 weight percent said xylylene glycol di-2-ethylhexanoate and about 40 weight percent to about 90 weight percent said second plasticizer, each based on the total weight of said plasticizer.

20. The article of claim 19 wherein said second plasticizer is selected from the group consisting of dioctyl terephthalate, diisooctyl phthalate, di-2-ethylhexyl phthalate, di-2-ethylhexyl terephthalate, tri-2-ethylhexyl trimellitate, di-2-propylheptyl phthalate, diisononyl phthalate, diisodecyl phthalate, diisoundecyl phthalate, ditridecyl phthalate, trioctyl trimellitate, triisononyl trimellitate, 2,2,4-trimethyl-1,3-pentanediol diisobutyrate, isononyl benzoate, isodecyl benzoate, diisononyl 1,2-cyclohexanedicarboxylate, dioctyl adipate, di-2-ethylhexyl adipate, triethylene glycol di-2-ethylhexanoate, diethylene glycol dibenzoate, dipropylene glycol dibenzoate, and dibenzoates produced from mixtures of diethylene glycol and dipropylene glycol.

21. The article of claim 19 wherein said second plasticizer comprises di-2-ethylhexyl terephthalate, diisononyl phthalate, and/or diisononyl 1,2-cyclohexanedicarboxylate.

22. The article of claim 19 wherein the plasticizer comprises about 10 weight percent to about 30 weight percent xylylene glycol di-2-ethylhexanoate and about 70 weight percent to about 90 weight percent said second plasticizer, each based on the total weight of said plasticizer.

23. The article of claim 19 wherein the article is a resilient vinyl flooring, floor tiles, fabric coating, adhesives, vinyl foams, home furnishings, toys and child care articles, gloves, shoes, building and construction, automotive, apparel, recreation, tools, novelties, and/or vinyl wall coverings.

* * * * *